United States Patent
Oprisan et al.

(10) Patent No.: US 11,716,313 B2
(45) Date of Patent: *Aug. 1, 2023

(54) METHODS, SYSTEMS, AND COMPUTER READABLE MEDIA FOR IMPLEMENTING BANDWIDTH LIMITATIONS ON SPECIFIC APPLICATION TRAFFIC AT A PROXY ELEMENT

(71) Applicant: Keysight Technologies, Inc., Santa Rosa, CA (US)

(72) Inventors: Gabriel Oprisan, Bucharest (RO); Michael Paul Galime, Utica, NY (US); Scott Walker Register, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/111,445

(22) Filed: Dec. 3, 2020

(65) Prior Publication Data

US 2021/0119982 A1    Apr. 22, 2021

Related U.S. Application Data

(63) Continuation of application No. 16/103,598, filed on Aug. 14, 2018, now Pat. No. 10,893,030.

(30) Foreign Application Priority Data

Aug. 10, 2018    (RO) .............................. a 2018 00581

(51) Int. Cl.
*H04L 29/06* (2006.01)
*H04L 9/40* (2022.01)
(Continued)

(52) U.S. Cl.
CPC .......... *H04L 63/0485* (2013.01); *H04L 45/38* (2013.01); *H04L 63/0281* (2013.01);
(Continued)

(58) Field of Classification Search
CPC . H04L 63/0485; H04L 45/38; H04L 63/0281; H04L 63/166; H04L 67/56;
(Continued)

(56) References Cited

U.S. PATENT DOCUMENTS

| | | | |
|---|---|---|---|
| 5,161,189 A | * | 11/1992 | Bray ..................... H04L 9/0891 380/43 |
| 5,557,678 A | | 9/1996 | Ganesan |

(Continued)

FOREIGN PATENT DOCUMENTS

| | | |
|---|---|---|
| EP | 2777226 B1 | 8/2019 |
| EP | 3528430 A1 | 8/2019 |
| WO | 2016176070 A1 | 11/2016 |

OTHER PUBLICATIONS

Non-Final Office Action for U.S. Appl. No. 17/105,411 (dated Mar. 7, 2022).

(Continued)

*Primary Examiner* — Abu S Sholeman

(57) ABSTRACT

Methods, systems, and computer readable media for implementing bandwidth limitations on specific application traffic at a proxy element are disclosed. One exemplary method includes receiving, at a proxy element, a packet flow from at least one source client, identifying encrypted packets associated with a specific application traffic type from among the packet flow, and directing the identified encrypted packets to a bandwidth limiter in the proxy element. The method further includes applying a bandwidth limitation operation to the identified encrypted packets and decrypting the identified encrypted packets if an accumulated amount of pay- (Continued)

load bytes of the identified encrypted packets complies with the parameters of the bandwidth limitation operation.

17 Claims, 4 Drawing Sheets

(51) Int. Cl.
    *H04L 69/16*    (2022.01)
    *H04L 45/00*    (2022.01)
    *H04L 67/56*    (2022.01)
(52) U.S. Cl.
    CPC ............ *H04L 63/166* (2013.01); *H04L 67/56* (2022.05); *H04L 69/16* (2013.01)
(58) Field of Classification Search
    CPC ......... H04L 69/16; H04L 47/27; H04L 47/22; H04L 63/0428; H04L 12/26
    See application file for complete search history.

(56)  References Cited

U.S. PATENT DOCUMENTS

| | | | |
|---|---|---|---|
| 6,240,416 B1 | 5/2001 | Immon et al. |
| 6,330,671 B1 | 12/2001 | Aziz |
| 6,480,488 B1 | 11/2002 | Huang |
| 6,684,331 B1 | 1/2004 | Srivastava |
| 7,340,744 B2 | 3/2008 | Chandwadkar et al. |
| 7,363,353 B2 | 4/2008 | Ganesan et al. |
| 7,373,412 B2 | 5/2008 | Colas et al. |
| 7,421,506 B2 | 9/2008 | Ni et al. |
| 7,562,213 B1 | 7/2009 | Timms |
| 7,634,650 B1 | 12/2009 | Shah et al. |
| 7,684,414 B2 * | 3/2010 | Durst ................ H04L 63/0428 370/400 |
| 7,701,853 B2 * | 4/2010 | Malhotra ............ H04L 47/27 370/233 |
| 7,778,194 B1 | 8/2010 | Yung |
| 7,971,240 B2 | 6/2011 | Guo et al. |
| 8,270,942 B2 | 9/2012 | Zabawskyj et al. |
| 8,457,126 B2 | 6/2013 | Breslin et al. |
| 8,514,756 B1 | 8/2013 | Ramachandra et al. |
| 8,566,247 B1 | 10/2013 | Nagel et al. |
| 8,595,835 B2 | 11/2013 | Kolton et al. |
| 8,601,152 B1 | 12/2013 | Chou |
| 8,654,974 B2 | 2/2014 | Anderson et al. |
| 8,788,805 B2 | 7/2014 | Herne et al. |
| 8,881,282 B1 | 11/2014 | Aziz et al. |
| 8,929,356 B2 | 1/2015 | Pandey et al. |
| 8,938,611 B1 | 1/2015 | Zhu et al. |
| 8,953,439 B1 | 2/2015 | Lin et al. |
| 8,964,537 B2 | 2/2015 | Brolin |
| 9,065,642 B2 | 6/2015 | Zaverucha et al. |
| 9,298,560 B2 | 3/2016 | Janakiraman et al. |
| 9,380,002 B2 | 6/2016 | Johansson et al. |
| 9,392,010 B2 | 7/2016 | Friedman et al. |
| 9,407,643 B1 | 8/2016 | Bavington |
| 9,565,202 B1 | 2/2017 | Kindlund et al. |
| 9,660,913 B2 | 5/2017 | Newton |
| 9,673,984 B2 | 6/2017 | Jiang et al. |
| 9,680,869 B2 | 6/2017 | Buruganahalli et al. |
| 9,800,560 B1 | 10/2017 | Guo et al. |
| 9,807,121 B1 | 10/2017 | Levy et al. |
| 9,860,154 B2 | 1/2018 | Balabine et al. |
| 9,882,929 B1 | 1/2018 | Ettema et al. |
| 9,893,883 B1 | 2/2018 | Chaubey et al. |
| 9,906,401 B1 | 2/2018 | Rao |
| 9,998,955 B1 | 6/2018 | MacCarthaigh |
| 10,063,591 B1 | 8/2018 | Jiang et al. |
| 10,079,810 B1 | 9/2018 | Moore et al. |
| 10,079,843 B2 | 9/2018 | Friedman et al. |
| 10,116,553 B1 | 10/2018 | Penno et al. |
| 10,291,651 B1 | 5/2019 | Chaubey |
| 10,326,741 B2 | 6/2019 | Rothstein et al. |
| 10,404,597 B2 | 9/2019 | Bakshi |
| 10,419,965 B1 | 9/2019 | Kadosh et al. |
| 10,423,774 B1 | 9/2019 | Zelenov et al. |
| 10,482,239 B1 | 11/2019 | Liu et al. |
| 10,516,532 B2 | 12/2019 | Taub et al. |
| 10,749,808 B1 | 8/2020 | MacCarthaigh |
| 10,903,985 B2 | 1/2021 | Bergeron |
| 10,931,797 B2 | 2/2021 | Ahn et al. |
| 10,951,660 B2 | 3/2021 | Rogers et al. |
| 10,992,652 B2 | 4/2021 | Putatunda et al. |
| 11,075,886 B2 | 7/2021 | Paul et al. |
| 11,165,831 B2 | 11/2021 | Higgins et al. |
| 11,489,666 B2 | 11/2022 | Bergeron |
| 2001/0028631 A1 * | 10/2001 | Iwamura ............ H04Q 11/0478 370/236 |
| 2002/0116485 A1 | 8/2002 | Black et al. |
| 2003/0004688 A1 | 1/2003 | Gupta et al. |
| 2003/0161335 A1 | 8/2003 | Fransdonk |
| 2003/0163684 A1 | 8/2003 | Fransdonk |
| 2003/0165241 A1 | 9/2003 | Fransdonk |
| 2004/0083362 A1 | 4/2004 | Park et al. |
| 2004/0168050 A1 | 8/2004 | Desrochers et al. |
| 2004/0268148 A1 | 12/2004 | Karjala et al. |
| 2005/0050362 A1 | 3/2005 | Peles |
| 2005/0111437 A1 | 5/2005 | Maturi |
| 2005/0160269 A1 | 7/2005 | Akimoto |
| 2006/0056300 A1 * | 3/2006 | Tamura ................ H04L 47/10 370/235 |
| 2006/0085862 A1 | 4/2006 | Witt et al. |
| 2006/0259579 A1 | 11/2006 | Beverly |
| 2007/0022284 A1 | 1/2007 | Vishwanathan |
| 2007/0033408 A1 | 2/2007 | Morten |
| 2007/0043940 A1 | 2/2007 | Gustave et al. |
| 2007/0078929 A1 | 4/2007 | Beverly |
| 2007/0156726 A1 | 7/2007 | Levy |
| 2007/0169190 A1 | 7/2007 | Kolton et al. |
| 2007/0179995 A1 | 8/2007 | Prahlad et al. |
| 2008/0005782 A1 | 1/2008 | Aziz |
| 2008/0031141 A1 | 2/2008 | Lean et al. |
| 2008/0320297 A1 | 12/2008 | Sabo et al. |
| 2009/0150521 A1 | 6/2009 | Tripathi |
| 2009/0150527 A1 | 6/2009 | Tripathi et al. |
| 2009/0150883 A1 | 6/2009 | Tripathi et al. |
| 2009/0220080 A1 | 9/2009 | Herne et al. |
| 2009/0222567 A1 | 9/2009 | Tripathi et al. |
| 2009/0254990 A1 | 10/2009 | McGee |
| 2010/0250769 A1 | 9/2010 | Barreto et al. |
| 2011/0231659 A1 | 9/2011 | Sinha |
| 2011/0286461 A1 | 11/2011 | Ichino et al. |
| 2011/0289311 A1 | 11/2011 | Roy-Chowdhury et al. |
| 2011/0314269 A1 * | 12/2011 | Stavrou ............... G06F 21/6209 713/150 |
| 2012/0082073 A1 | 4/2012 | Andreasen et al. |
| 2012/0137289 A1 | 5/2012 | Nolterieke et al. |
| 2012/0210318 A1 | 8/2012 | Sanghvi et al. |
| 2012/0236823 A1 | 9/2012 | Kompella et al. |
| 2012/0304244 A1 | 11/2012 | Xie et al. |
| 2013/0054761 A1 | 2/2013 | Kempf et al. |
| 2013/0070777 A1 | 3/2013 | Hutchison et al. |
| 2013/0117847 A1 | 5/2013 | Friedman et al. |
| 2013/0204849 A1 | 8/2013 | Chacko |
| 2013/0239119 A1 | 9/2013 | Garg et al. |
| 2013/0265883 A1 | 10/2013 | Henry et al. |
| 2013/0272136 A1 | 10/2013 | Ali et al. |
| 2013/0301830 A1 | 11/2013 | Bar-El et al. |
| 2013/0343191 A1 * | 12/2013 | Kim ..................... H04L 47/11 370/235 |
| 2014/0010083 A1 | 1/2014 | Hamdi et al. |
| 2014/0059200 A1 | 2/2014 | Nguyen et al. |
| 2014/0082348 A1 | 3/2014 | Chandrasekaran et al. |
| 2014/0115702 A1 | 4/2014 | Li et al. |
| 2014/0189093 A1 | 7/2014 | Du Toit et al. |
| 2014/0189861 A1 | 7/2014 | Gupta et al. |
| 2014/0189961 A1 | 7/2014 | He et al. |
| 2014/0226820 A1 | 8/2014 | Chopra et al. |
| 2014/0351573 A1 | 11/2014 | Martini |
| 2015/0026313 A1 | 1/2015 | Chawla et al. |
| 2015/0039889 A1 | 2/2015 | Andoni |
| 2015/0052345 A1 | 2/2015 | Martini |
| 2015/0113132 A1 | 4/2015 | Srinivas et al. |

(56) References Cited

U.S. PATENT DOCUMENTS

| | | |
|---|---|---|
| 2015/0113264 A1 | 4/2015 | Wang et al. |
| 2015/0124622 A1 | 5/2015 | Kovvali et al. |
| 2015/0172219 A1 | 6/2015 | Johansson et al. |
| 2015/0264083 A1 | 9/2015 | Prenger et al. |
| 2015/0281954 A1 | 10/2015 | Warren |
| 2015/0288679 A1 | 10/2015 | Ben-Nun et al. |
| 2015/0295780 A1 | 10/2015 | Hsiao et al. |
| 2015/0319030 A1 | 11/2015 | Nachum |
| 2015/0341212 A1 | 11/2015 | Hsiao et al. |
| 2015/0379278 A1 | 12/2015 | Thota et al. |
| 2016/0014016 A1 | 1/2016 | Guichard et al. |
| 2016/0019232 A1 | 1/2016 | Lambright |
| 2016/0080502 A1 | 3/2016 | Yadav et al. |
| 2016/0105469 A1 | 4/2016 | Galloway et al. |
| 2016/0105814 A1 | 4/2016 | Hurst et al. |
| 2016/0119374 A1 | 4/2016 | Williams et al. |
| 2016/0127517 A1 | 5/2016 | Shcherbakov et al. |
| 2016/0142440 A1 | 5/2016 | Qian et al. |
| 2016/0248685 A1 | 8/2016 | Pignataro et al. |
| 2016/0277321 A1 | 9/2016 | Johansson et al. |
| 2016/0277971 A1 | 9/2016 | Hamdi et al. |
| 2016/0294784 A1 | 10/2016 | Hopkins et al. |
| 2016/0344754 A1 | 11/2016 | Rayapeta et al. |
| 2016/0373185 A1 | 12/2016 | Wentzloff et al. |
| 2017/0048328 A1 | 2/2017 | Korotaev et al. |
| 2017/0070531 A1 | 3/2017 | Huston, III et al. |
| 2017/0237640 A1 | 8/2017 | Stocker |
| 2017/0237719 A1 | 8/2017 | Schwartz et al. |
| 2017/0289104 A1 | 10/2017 | Shankar et al. |
| 2017/0302554 A1 | 10/2017 | Chandrasekaran et al. |
| 2017/0339022 A1 | 11/2017 | Hegde et al. |
| 2017/0364794 A1 | 12/2017 | Mahkonen et al. |
| 2018/0006923 A1 | 1/2018 | Gao et al. |
| 2018/0091236 A1* | 3/2018 | Damus ................ H04B 13/02 |
| 2018/0091421 A1 | 3/2018 | Ma et al. |
| 2018/0091427 A1 | 3/2018 | Kumar et al. |
| 2018/0097787 A1 | 4/2018 | Murthy et al. |
| 2018/0097788 A1 | 4/2018 | Murthy |
| 2018/0097840 A1 | 4/2018 | Murthy |
| 2018/0124025 A1 | 5/2018 | Lam et al. |
| 2018/0176036 A1 | 6/2018 | Butcher et al. |
| 2018/0176192 A1 | 6/2018 | Davis et al. |
| 2018/0198838 A1 | 7/2018 | Murgia et al. |
| 2018/0234322 A1 | 8/2018 | Cohn et al. |
| 2018/0241699 A1 | 8/2018 | Raney |
| 2018/0254990 A1* | 9/2018 | Ramaiah ............ H04L 47/2433 |
| 2018/0278419 A1 | 9/2018 | Higgins et al. |
| 2018/0331912 A1 | 11/2018 | Edmison et al. |
| 2018/0332078 A1 | 11/2018 | Kumar et al. |
| 2018/0351970 A1 | 12/2018 | Majumder et al. |
| 2018/0367422 A1 | 12/2018 | Raney et al. |
| 2018/0375644 A1 | 12/2018 | Karagiannis et al. |
| 2019/0028376 A1 | 1/2019 | Ganapathy et al. |
| 2019/0058714 A1 | 2/2019 | Joshi et al. |
| 2019/0068561 A1 | 2/2019 | Caragea |
| 2019/0068564 A1 | 2/2019 | Putatunda et al. |
| 2019/0104437 A1 | 4/2019 | Bartfai-Walcott et al. |
| 2019/0116111 A1 | 4/2019 | Izard et al. |
| 2019/0166049 A1 | 5/2019 | Bakshi |
| 2019/0205151 A1 | 7/2019 | Suzuki |
| 2019/0205244 A1 | 7/2019 | Smith |
| 2019/0260794 A1 | 8/2019 | Woodford et al. |
| 2019/0303385 A1 | 10/2019 | Ching et al. |
| 2019/0349403 A1* | 11/2019 | Anderson ........... H04L 41/0893 |
| 2019/0373052 A1 | 12/2019 | Pollitt et al. |
| 2020/0036610 A1 | 1/2020 | Indiresan et al. |
| 2020/0053064 A1 | 2/2020 | Oprisan et al. |
| 2020/0067700 A1 | 2/2020 | Bergeron |
| 2020/0076773 A1 | 3/2020 | Monat et al. |
| 2020/0104052 A1 | 4/2020 | Vijayan et al. |
| 2020/0137021 A1 | 4/2020 | Janakiraman |
| 2020/0137115 A1 | 4/2020 | Janakiraman et al. |
| 2021/0083857 A1 | 3/2021 | Bergeron |
| 2021/0111975 A1 | 4/2021 | Raney |
| 2021/0160275 A1 | 5/2021 | Anderson et al. |
| 2021/0194779 A1 | 6/2021 | Punj et al. |

OTHER PUBLICATIONS

"Network Monitoring Step 2: The Next-Generation of Packet Brokers," Mantisnet, pp. 1-5 (2021).

Notice of Allowance and Examiner Initiated Interview Summary for U.S. Appl. No. 16/781,542 (dated Aug. 2, 2021).

Non-Final Office Action for U.S. Appl. No. 16/781,542 (dated Feb. 24, 2021).

Hardegen et al., "Flow-based Throughput Prediction using Deep Learning and Real-World Network Traffic," 15th International Conference on Network and Service Management (CNSM), pp. 1-9 (2019).

"The ABCs of Network Visibility," Ixia, pp. 1-57 (2017).

Eisen et al., "goProbe: A Scalable Distributed Network Monitoring Solution," IEEE Xplore, pp. 1-10 (2015).

Lee et al., "Public Review for Towards Scalable Internet Traffic Measurement and Analysis with Hadoop," ACM SIGCOMM Computer Communication Review, vol. 43, No. 1, pp. 1-9 (Jan. 2013).

Zou et al., "An Enhanced Netflow Data Collection System," 2012 Second International Conference on Instrumentation & Measurement, Computer, Communication and Control, pp. 508-511 (2012).

He et al., "Data Deduplication Techniques," 2010 International Conference on Future Information Technology and Management Engineering, pp. 1-4 (2010).

Applicant-Initiated Interview Summary for U.S. Appl. No. 16/103,598 (dated Oct. 22, 2020).

Notice of Allowance and Fee(s) Due for U.S. Appl. No. 16/103,598 (dated Oct. 16, 2020).

Notice of Allowance and Fee(s) Due and Examiner-Initiated Interview Summary for U.S. Appl. No. 16/113,360 (dated Oct. 15, 2020).

Non-Final Office Action for U.S. Appl. No. 16/781,542 (dated Sep. 25, 2020).

Non-Final Office Action for U.S. Appl. No. 15/980,699 (dated Sep. 22, 2020).

Notice of Allowance and Fee(s) Due for U.S. Appl. No. 15/608,369 (dated Aug. 19, 2020).

Advisory Action and AFCP 2.0 Decision for U.S. Appl. No. 15/608,369 (dated Jul. 1, 2020).

Advisory Action and AFCP 2.0 Decision for U.S. Appl. No. 15/980,699 (dated Jun. 30, 2020).

Non-Final Office Action for U.S. Appl. No. 16/113,360 (dated May 19, 2020).

Non-Final Office Action for U.S. Appl. No. 16/103,598 (dated May 11, 2020).

Final Office Action for U.S. Appl. No. 15/608,369 (dated Apr. 22, 2020).

Final Office Action for U.S. Appl. No. 15/980,699 (dated Apr. 20, 2020).

Commonly-assigned, co-pending U.S. Appl. No. 16/781,542 for "Methods, Systems, and Computer Readable Media for Processing Network Flow Metadata at a Network Packet Broker," (Unpublished, filed Feb. 4, 2020).

Stankovic, "How to solve duplicated NetFlow caused by multiple exporters," https://www.netvizura.com/blog/how-to-solve-duplicated-netflow-caused-by-multiple-exporters, pp. 1-4 (Accessed Jan. 15, 2020).

"Jumbo Frame," Wikipedia, https://en.wikipedia.org/wiki/Jumbo_frame, pp. 1-4 (Jan. 15, 2020).

"How is the MTU is 65535 in UDP but ethernet does not allow frame size more that 1500 bytes," ServerFault, TCPIP, pp. 1-9 (Accessed Jan. 15, 2020).

"Network Monitoring Step 2: The Next-Generation of Packet Brokers," MantisNet, pp. 1-6 (2020).

"CPacket cVu 2440NG/3240NG," https://www.cpacket.com/resources/cvu-3240-2440-datasheet/, pp. 1-4 (Accessed Jan. 15, 2020).

"What are Microservices," An Introduction to Microservices, https://opensource.com/resources/what-are-microservices, pp. 1-8 (Accessed Jan. 15, 2020).

(56) References Cited

OTHER PUBLICATIONS

"IPv6," Wikipedia, https://en.wikipedia.org/wiki/IPv6, pp. 1-15 (Jan. 8, 2020).
Paul, Santanu, "Network Visibility Component with Netflow Jumbo Frame Support," The IP.com Journal, pp. 1-8 (Aug. 2019).
Paul, Santanu, "Methods and Systems for Session-Aware Collection of Netflow Statistics," The IP.com Journal, pp. 1-5 (Jul. 2019).
Pandey, Shardendu; Johansson, Stefan Jan, "Network Packet Broker with Flow Segmentation Capability," The IP.com Journal, pp. 1-6 (Jul. 2019).
Paul, Santanu, "Network Packet Broker with Flow Segmentation Capability," The IP.com Journal, pp. 1-6 (Aug. 2019).
Paul, Santanu, "Custom Key Performance Indicator (KPI) Network Visibility System," The IP.com Journal, pp. 1-4 (Jul. 2019).
Paul, Santanu, "Self-Healing Network Visibility System," The IP.com Journal, pp. 1-5 (Jun. 2019).
"About NetFlow," Watchguard Technologies, Inc., pp. 1-3 (2019).
Non-Final Office Action for U.S. Appl. No. 15/980,699 (dated Dec. 9, 2019).
"Multiprotocol Label Switching," Wikipedia, https://en.wikipedia.org/wiki/multiprotocol_label_switching, pp. 1-7 (Dec. 6, 2019).
"Netflow," Wikipedia, https://en.wikipedia.org/wiki/NetFlow, pp. 1-9 (Dec. 3, 2019).
Non-Final Office Action for U.S. Appl. No. 15/608,369 (dated Oct. 31, 2019).
"NetFlow Collector," Kentipedia, Kentik, pp. 1-4 (Sep. 17, 2019).
Advisory Action for U.S. Appl. No. 15/608,369 (dated Sep. 13, 2019).
Nubeva, "Nubeva TLS Decrypt: Out-of-Band Decrypted Visibility for the Cloud," www.nubeva.com/decryption, pp. 1-8 (Sep. 2019).
Nubeva, "What is Symmetric Key Intercep Architecture?" https://www.nubeva.com/blog/what-is-symmetric-key-intercept-architecture, pp. 1-4 (Aug. 8, 2019).
Final Office Action for U.S. Appl. No. 15/608,369 (dated Jun. 27, 2019).
Notice of Allowance and Fee(s) Due for U.S. Appl. No. 15/826,787 (dated Apr. 25, 2019).
Petryschuk, "NetFlow Basics: An Introduction to Monitoring Network Traffic," Auvik, https://www.auvik.com/, pp. 1-8 (Mar. 19, 2019).
Non-Final Office Action for U.S. Appl. No. 15/608,369 (dated Mar. 7, 2019).
"Automatic versus Manual NetFlow Deduplication," Noction, https://www.noction.com/blog/automatic-manual-netflow-deduplication, pp. 1-7 (Feb. 1, 2019).
Paul, Santanu, "Network Visibility System with Integrated Netflow Over Syslog Reporting Capability" The IP.com Journal, pp. 1-7 (Jan. 28, 2019).
Non-Final Office Action for U.S. Appl. No. 15/826,787 (dated Jan. 3, 2019).
Leskiw, "Understanding Syslog: Servers, Messages & Security," https://www.networkmanagementsoftware.com/what-is-syslog/, pp. 1-7 (Oct. 2018).
Commonly-assigned, co-pending U.S. Appl. No. 16/113,360 for "Monitoring Encrypted Network Traffic Flows in a Virtual Environment Using Dynamic Session Key Acquisition Techniques," (Unpublished, filed Aug. 27, 2018).
McGillicuddy, "Next-Generation Network Packet Brokers: Defining the Future of Network Visibility Fabrics," Enterprise Management Associates (EMA) Research, Niagara Networks, pp. 1-27 (Aug. 2018).
Commonly-assigned, co-pending U.S. Appl. No. 16/103,598 for "Methods, Systems, and Computer Readable Media for Implementing Bandwidth Limitations on Specific Application Traffic at a Proxy Element," (Unpublished, filed Aug. 14, 2018).
Evans, David, "Network Packet Broker with Dynamic Filter Rules," The IP.com Journal, pp. 1-8 (Jun. 2018).
Schulist et al., "Linux Socket Filtering aka Berkeley Packet Filter (BPF)," Wayback Machine, https://www.kernel.org/doc/Documentation/networking/filter.txt, pp. 1-25 (Jun. 8, 2018).
Commonly-assigned, co-pending U.S. Appl. No. 15/980,699 for "Methods, Systems, and Computer Readable Media for Monitoring Encrypted Network Traffic Flows," (Unpublished, filed May 15, 2018).
"Principles of Chaos Engineering," https://principlesofchaos.org/?lang=ENcontent, pp. 1-3 (May 2018).
Notice of Allowance and Fee(s) Due for U.S. Appl. No. 15/980,699 (dated Feb. 8, 2021).
Notice of Allowance and Examiner Interview Summary for U.S. Appl. No. 17/105,411 (dated Aug. 24, 2022).
Notice of Allowability for U.S. Appl. No. 17/105,411 dated Sep. 14, 2022).

\* cited by examiner

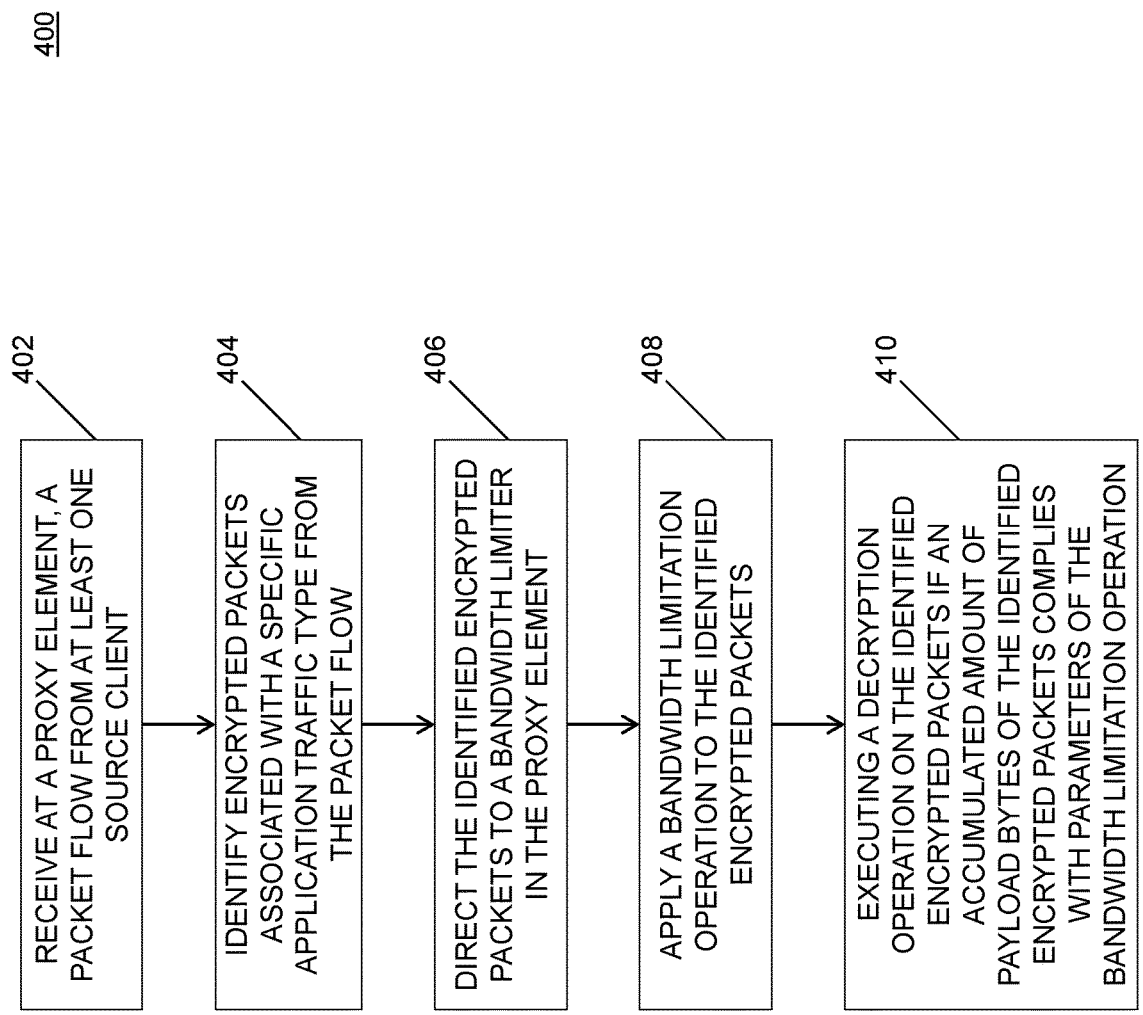

METHODS, SYSTEMS, AND COMPUTER READABLE MEDIA FOR IMPLEMENTING BANDWIDTH LIMITATIONS ON SPECIFIC APPLICATION TRAFFIC AT A PROXY ELEMENT

PRIORITY CLAIM

This application is a continuation of U.S. application Ser. No. 16/103,598, filed Aug. 14, 2018, which claims the priority benefit of Romanian Patent Application Serial No. a 2018 00581, filed Aug. 10, 2018, the disclosures of which are incorporated herein by reference in their entireties.

TECHNICAL FIELD

The subject matter described herein relates to the monitoring and controlling of transmission control protocol (TCP) packet traffic. More particularly, the subject matter described herein relates to methods, systems, and computer readable media for implementing bandwidth limitations on specific application traffic at a proxy element.

BACKGROUND

Network elements, such as transport layer security (TLS) proxy elements, intercept application traffic traversing TCP connections and may forward the traffic after some level of processing. For such network elements, one measurement of performance is the rate at which the TLS proxy can monitor and decrypt bytes of data communicated between endpoints (e.g., a client device and a server device) serviced by the TLS proxy.

While such a TLS proxy-based monitoring operation is generally feasible, the associated processing requirements can be very demanding. Notably, the proxy element must be able to first terminate and decrypt packet flows for monitoring purposes and then subsequently re-encrypt and transmit the packet flows to a destination server in real time or near real time. Additional problems pertaining to TLS proxy-based monitoring arise when the volume of traffic traversing the monitoring proxy element exceeds the decrypt and/or re-encrypt processing capabilities of the proxy element. In some monitoring proxy solutions utilized by network operators, the proxy element may be configured to drop received packets and/or packet flows in the event the volume of traffic traversing the proxy element exceeds the proxy element's processing capacity. This solution is highly undesirable in situations where the monitoring proxy element is being used to implement network security policies. In such instances, packet monitoring systems are incapable of sufficiently responding to temporary surges or transients in monitored traffic volumes received as ingress packet traffic by the proxy element.

Accordingly, in light of these difficulties associated with conventional solutions, there exists a need for methods, systems, and computer readable media for implementing bandwidth limitations on specific application traffic at a proxy element.

SUMMARY

According to one aspect, the subject matter described herein includes a method for implementing bandwidth limitations on specific application traffic at a proxy element. The method includes receiving, at a proxy element, a packet flow from at least one source client, identifying encrypted packets associated with a specific application traffic type from among the packet flow, and directing the identified encrypted packets to a bandwidth limiter in the proxy element. The method further includes applying a bandwidth limitation operation to the identified encrypted packets and decrypting the identified encrypted packets if an accumulated amount of payload bytes of the identified encrypted packets complies with the parameters of the bandwidth limitation operation.

According to another aspect, the subject matter described herein includes a system for implementing bandwidth limitations on specific application traffic at a proxy element. The system includes a monitoring engine in the proxy element for receiving a packet flow from at least one source client, identifying encrypted packets associated with a specific application traffic type from among the packet flow. The system further includes a bandwidth limiter in the proxy element for receiving the identified encrypted packets, applying a bandwidth limitation operation to the identified encrypted packets and decrypting the identified encrypted packets if an accumulated amount of payload bytes of the identified encrypted packets complies with the parameters of the bandwidth limitation operation.

As used herein, the terms "session" and "connection" are used interchangeably and refer to communication between two entities via a telecommunication network, which may be a packet network, including networks that use the TCP protocol. For example, a session may be communication between an application on first node (e.g., a client device) and an application on a second node (e.g., a destination application server), where the first application is identified by a first IP address and TCP port number combination and the second application is identified by a second IP address and TCP port number combination. A request to initiate a session may be referred to as a request to make a connection, or "a connection request." It will be understood by persons of ordinary skill in the art that two hardware nodes may communicate multiple sessions across the same physical layer connection, e.g., a network cable may support multiple sessions simultaneously. As used herein, the term "active session" refers to a session that is connecting, transmitting and/or receiving data, or disconnecting.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 4 is a flow chart illustrating an exemplary process for implementing bandwidth limitations on specific application traffic at a proxy element according to an embodiment of the subject matter described herein.

DETAILED DESCRIPTION

In accordance with the subject matter disclosed herein, systems, methods, and computer readable media for implementing bandwidth limitations on specific patterned application traffic at a proxy element are provided. In some embodiments, the proxy element is a TLS proxy hardware device that is provisioned with a software stack that is adapted to throttle bandwidth throughput associated with TLS decryption operations for a customer. Notably, the software stack may be configured to execute the decryption or encryption operations at various bandwidth throughput levels. Further, the TLS proxy element is configured to throttle connections that are subjected to the decryption and encryption operations without discarding packets or passing uninspected packets. In some embodiments, the TLS proxy includes a monitoring engine that is configured to independently manipulate the TCP stacks that facilitate communications with a source client and a destination server served by the TLS proxy in the manner described below. Although the following description describes the proxy element as an TLS proxy device, it is understood that the proxy element can comprises a secure socket layer (SSL) proxy device or any other device that is configured to function as a proxy element for any other specific application traffic without departing from the scope of the disclosed subject matter.

Reference will now be made in detail to exemplary embodiments of the present invention, examples of which are illustrated in the accompanying drawings. Wherever possible, the same reference numbers will be used throughout the drawings to refer to the same or like parts.

Figure 1:
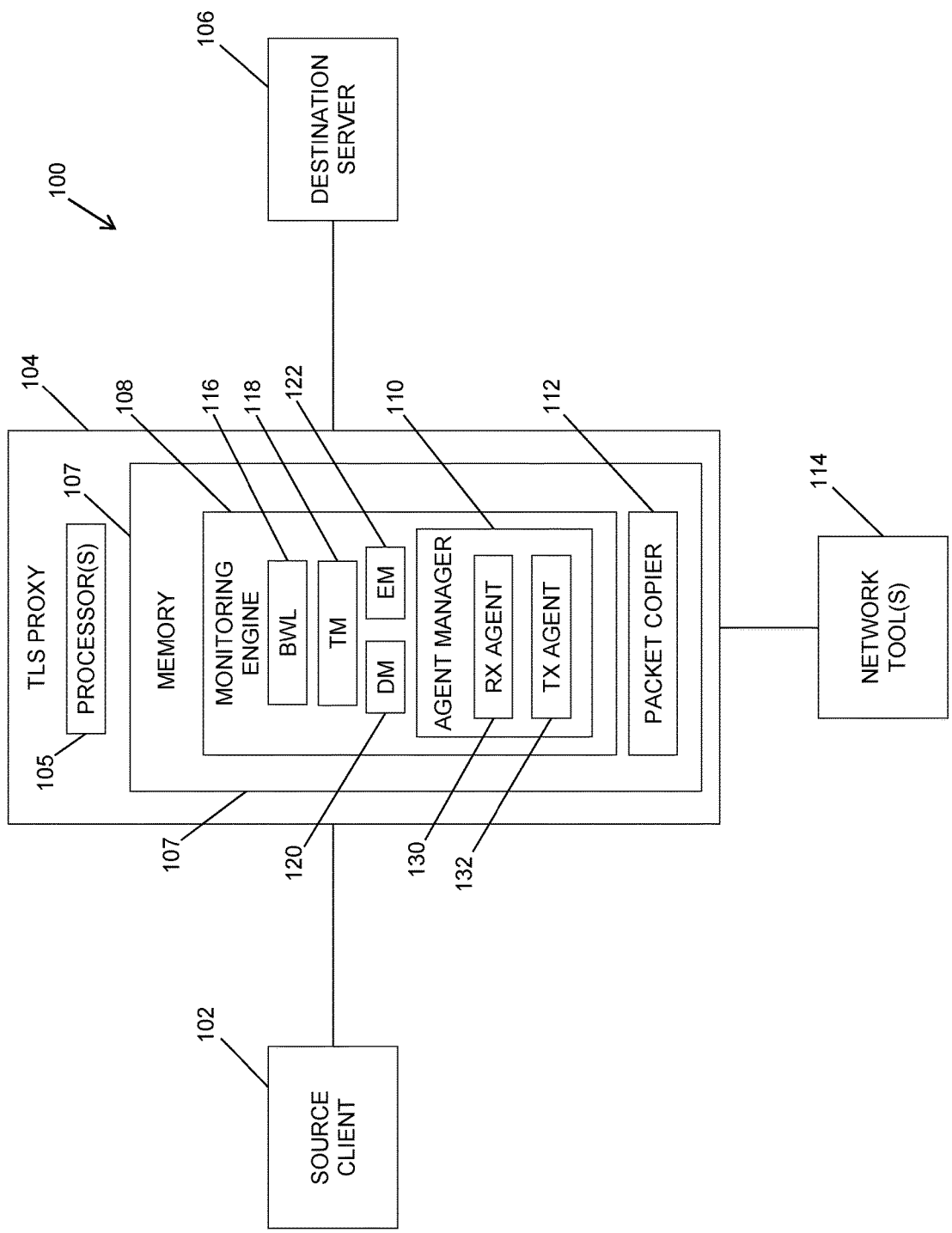
FIG. 1 is a block diagram illustrating an exemplary system for implementing bandwidth limitations on specific application traffic at a proxy element according to an embodiment of the subject matter described herein.

FIG. 1 includes a proxy element 104 (e.g., a TLS proxy device) that is communicatively connected to a source client 102 and a destination server 106. Proxy element 104 may include one or more processors 105, such as a central processing unit (e.g., a single core or multiple processing cores), a microprocessor, a microcontroller, a network processor, an application-specific integrated circuit (ASIC), or the like. Proxy element 104 may also include memory 107. Memory 107 may comprise random access memory (RAM), flash memory, a magnetic disk storage drive, and the like. In some embodiments, memory 107 may be configured to store a monitoring engine 108 and a packet copier 112. Monitoring engine 108 comprises a number of components including a bandwidth limiter 116, throttle manager 118, decryption manager 120, encryption manager 122, and agent manager 110. Notably, each of bandwidth limiter 116, throttle manager 118, decryption manager 120, encryption manager 122, and agent manager 110 can perform various monitoring, management, communication, and/or throttling functionalities for proxy element 104 when executed by processor(s) 105.

In some embodiments, monitoring engine 108 comprises a software stack that performs the throttling functionalities for proxy element 104. As described in greater detail below, monitoring engine 108 utilizes bandwidth limiter 116 to monitor ingress TCP packet traffic and to determine whether the packet traffic is to be subjected to decryption operations or encryption operations. For example, bandwidth limiter 116 in monitoring engine 108 can be configured to temporarily suspend a current decryption operation (or encryption operation) should the count of the total number of payload bytes received during the current time interval period exceeds the maximum payload byte count threshold. Notably, bandwidth limiter 116 is configured to suspend further decryption operations on the received TCP payload bytes. In such instances, bandwidth limiter 116 subsequently stores the ingress packet traffic in a buffer and/or receiving agent 130 in the event the total payload byte count threshold is exceeded. In particular, bandwidth limiter 116 only throttles a specific application traffic type received by proxy element 104. As such, the overall amount of packet traffic (previously) received by proxy element 104 is unaffected by the bandwidth limiter. Additional explanation of the bandwidth limitation operations is described below and in FIG. 2.

Throttle manager 118 is a component of monitoring engine 108 that is responsible for measuring the throughput of ingress TCP packet traffic and determining whether the volume of ingress flow received by proxy element 104 should be reduced or increased. Decryption manager 120 includes a component that is responsible for executing a decryption operation on ingress encrypted traffic received by proxy element 104. Similarly, encryption manager 122 includes a component that is responsible for executing an encryption operation on outgoing packet traffic that had been previously received by proxy element 104 and decrypted by decryption manager 120.

Agent manager 110 in monitoring engine 108 includes a receiving agent 130 and a transmitting agent 132. Specifically, agent manager 110 is responsible for the creation and management of receiving agent 130 and transmitting agent 132. In some embodiments, each of receiving agent 130 and transmitting agent 132 comprises a virtual client agent (or buffer element) that is responsible for either receiving packet traffic at or sending packet traffic from proxy element 104. Further, each of receiving agent 130 and transmitting agent 132 may be supported by an underlying hardware component, such as a network interface controller (NIC).

Packet copier 112 is a proxy element component that is responsible for capturing and copying packet traffic that has been decrypted by decryption manager 120. Notably, packet copier 112 may be configured to generate a copy the decrypted packet traffic and subsequently forward the copy of the decrypted packet traffic to a local or out-of-band network tool 114, which can be adapted to conduct various packet analysis operations. After the packet traffic has been copied, monitoring engine 108 may then utilize encryption manager 122 to re-encrypt the previously decrypted TLS packet traffic. Such encrypted TLS packet traffic is then provided to transmitting agent 132, which then directs the encrypted TLS packet traffic to destination server 106 in a transparent manner.

FIG. 1 further illustrates proxy element 104 being positioned in between a source client 102 and destination server 106. Source client 102 may include any user equipment (UE) device, such as a mobile smartphone, a personal computer, a laptop computer, or the like. Destination server 106 may include an application server that hosts a service application (e.g., a web server, an email server, etc.) accessible to source client 102 via a network connection that is serviced by proxy element 104. In particular, source client 102 may communicate TCP packet traffic flows to destination server 106. These packet traffic flows may include both clear text packet traffic and encrypted packet traffic.

In some monitoring scenarios, packet flows associated with a communication session conducted by source client 102 and destination server 106 may begin using unencrypted communication protocols and continue in this manner for a period of time. Moreover, the communications session may traverse through proxy element 104 that is positioned between the source client and destination server 106. After some time, the packet communications may be securely encrypted by the proxy element 104 using, for example, SSL or TLS (e.g., via HTTPS). As such, the packet communications may transition from an unsecured/non-encrypted packet flow to a secured/encrypted packet flow during the course of the established communication session as described in greater detail below.

In some embodiments, monitoring engine 108 is configured to inspect the communication packet traffic flows for SYN and SYN-ACK messages that are communicated between source client 102 and destination server 106. Consequently, monitoring engine 108 is able to detect the beginning of every TCP session that traverses proxy element 104. For example, after the TCP sessions are established, monitoring engine 108 is configured to inspect the initial ingress packets in an attempt to detect a 'client hello' message that indicates that an SSL session or TLS session is to be initiated. After determining that an SSL session or TLS session is to be established, monitoring engine 108 may initiate a process that triggers proxy element 104 to proxy the session connection between source client 102 and destination server 106.

For example, after identifying and/or detecting the initiation of an SSL or TLS session, monitoring engine 108 is configured to establish a separate TLS session with each of source client 102 and destination server 106. For example, proxy element 104 may receive a 'client hello' message sent by source client 102 that is directed to destination server 106. In response, proxy element 104 processes the received 'client hello' message and transparently functions as destination server 106 and completes a TLS handshake process to establish an TLS session between source client 102 and proxy element 104. In addition, proxy element 104 initiates its own TLS handshake procedure by sending a 'client hello' message to destination server 106. Proxy element 104 and destination server 106 complete the TLS handshake procedure and establish a second TLS session. By establishing a separate and transparent TLS session (or SSL session) with source client 102 and destination server 106 respectively, proxy element 104 functions as a man-in-the-middle entity on a network trunk line. After the two separate TLS sessions are established by proxy element 104, monitoring engine 108 in proxy element 104 begins to receive a number of encrypted TCP payload bytes over the SSL or TLS session.

Prior to deployment, bandwidth limiter 116 in proxy element 104 is configured with a maximum throughput rate (e.g., a maximum bit rate) from which the bandwidth limiter computes a plurality of bandwidth limitation parameters. For example, after having a maximum throughput rate designated, proxy element 104 can be configured by the bandwidth limiter 116 with a time value that represents a 'monitoring time slot interval'. For example, the monitoring time slot interval can represent a designated period of time by which monitoring engine 108 and/or bandwidth limiter 116 will conduct a counting of a number of bytes (e.g., TCP payload bytes) that is received from a source client. Notably, the monitoring time slot interval can be set or designated to be equal to any period of time or duration (e.g., 200 milliseconds). Likewise, proxy element 104 can also be provisioned with a predefined 'maximum payload byte count threshold'. The maximum payload byte count threshold represents the maximum number of bytes that can be processed during a monitoring time slot interval. The maximum payload byte count threshold can be designated in the proxy element to be equal to any amount or size (e.g., 100 MB, 200 MB, etc.). In some embodiments, a customer user may configure bandwidth limiter 116 with a maximum bit rate. Based on this configured bit rate, bandwidth limiter 116 can derive the maximum payload byte count threshold (i.e., a maximum byte count) using a predefined monitoring time slot interval that is fixed at 200 milliseconds.

Configured with both the monitoring time slot interval and the maximum payload byte count threshold, bandwidth limiter 116 is able to establish a throughput rate (e.g., a licensed throughput rate) by which the proxy element 104 conducts system operations (e.g., decryption operations and encryption operations). For example, by establishing the duration of the monitoring time slot interval to be equal to 200 milliseconds and the maximum payload byte count threshold to be equal to 200 megabytes, proxy element 104 can establish or set a bandwidth throughput rate of 8 gigabits (Gb) per second (equal to 1 gigabyte per second, i.e., 1 GB/s) for bandwidth limiter 116. If another bandwidth throughput rate (e.g., 2 Gb/s, 4 Gb/s, etc.) needs to be established for a particular TLS proxy device, the bandwidth limiter can appropriately adjust one or both of the monitoring time slot interval and the maximum payload byte count threshold to configure the desired bandwidth throughput rate. After the monitoring time slot interval and the maximum payload byte count threshold are established, proxy element 104 can be deployed in an operator's network.

Figure 2:
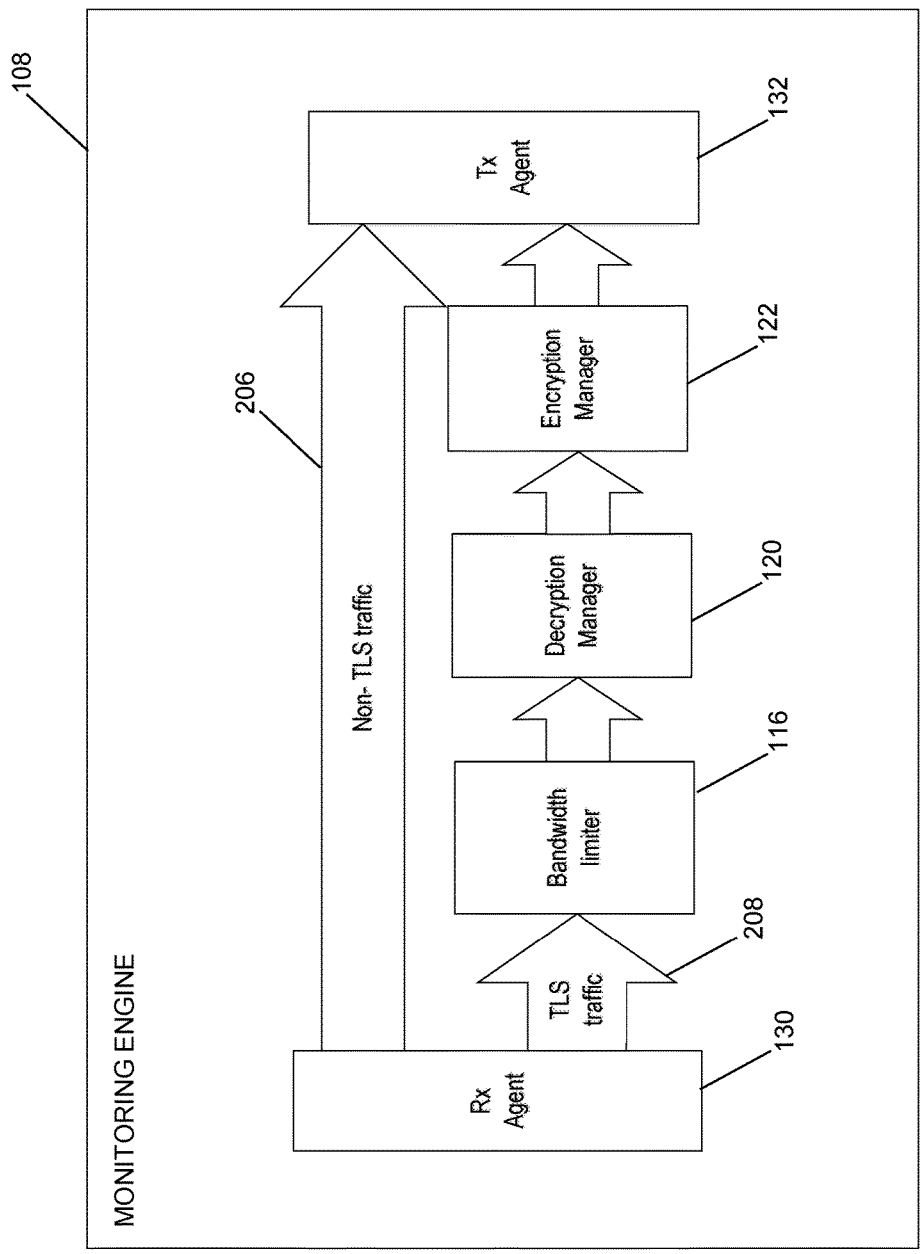
FIG. 2 is a block diagram illustrating an exemplary monitoring engine for implementing bandwidth limitations on specific application traffic at a proxy element according to an embodiment of the subject matter described herein.

FIG. 2 is a block diagram illustrating an exemplary monitoring engine (e.g., monitoring engine 108) for implementing bandwidth limitations on specific application traffic at a proxy element. In some embodiments, receiving agent 130 of monitoring engine 108 can be configured to inspect the TCP packet traffic communicated between source client 102 and destination server 106 in order to classify the received TCP network traffic into one or more specific application traffic types (e.g., TLS packet traffic, SSL packet traffic, non-TLS packet traffic, non-SSL packet traffic, etc.) existing at one or more network layers (e.g., transport layer, session layer, etc.). In some embodiments, monitoring engine 108 and/or receiving agent 130 is configured to inspect the first data packet in the TCP connection and attempt to find a TLS Client hello header after the TCP header. If the client hello header is present, monitoring engine 108 and/or receiving agent 130 is configured to identify/designate the current connection as a TLS connection.

Depending on the manner by which the packet traffic is classified (e.g., TLS traffic vs. non-TLS traffic), monitoring engine 108 can be configured to process the specific types of TCP packet traffic differently. Specifically, monitoring engine 108 and/or receiving agent 130 may be configured to identify encrypted packets associated with a specific application traffic type from among the entire packet flow, which may include both clear text packets and encrypted TLS packets (in this example embodiment). For example, monitoring engine 108 may use receiver agent 130 to forward non-TLS traffic 206 (e.g., clear text TCP traffic) directly to a transmitting agent 132. In contrast, monitoring engine 108 may forward encrypted TLS traffic 208 to bandwidth limiter 116.

Afterwards, monitoring engine 108 is configured to direct the identified encrypted packets (which are represented as TLS traffic 208 in FIG. 2) to the bandwidth limiter 116. Specifically, monitoring engine 108 is configured to use bandwidth limiter 116 to apply a bandwidth limitation operation to the received encrypted packets of TLS traffic 208. In some embodiments, bandwidth limiter 116 may be adapted to count the total TCP payload bytes (and not the TLS payload bytes) in order to account for the portion of the data associated with the TLS handshake operation because the handshake operation constitutes a significant amount of computing resource usage/consumption (as compared to the actual decryption of the TLS payload).

After receiving and identifying the encrypted TLS traffic 208, bandwidth limiter 116 processes the encrypted TLS traffic 208 in order to determine whether the packet traffic should be decrypted and subsequently processed prior to the re-encryption. For each decryption operation requiring execution, bandwidth limiter 116 is configured to determine whether a total payload byte count (e.g., TCP payload) volume exceeds the predefined maximum payload byte count threshold (e.g., total_byte_count>maximum_byte_count_threshold). For example, bandwidth limiter 116 sums the number of TCP payload bytes received over the current monitoring time interval (e.g., 200 milliseconds). In the event bandwidth limiter 116 determines that the maximum payload byte count threshold (e.g., 200 megabytes) is exceeded by the total payload byte count, then bandwidth limiter 116 is configured to initiate a function that suspends or postpones the current operation (e.g., a decryption operation or encryption operation) until the start of the next or following time interval period (i.e., when the current time interval period slot expires). In such instances, the encrypted TLS traffic 208 is stored in a buffer and/or receiving agent 130 until the current monitoring time interval expires and processing resumes.

Alternatively, if the bandwidth limiter 116 determines that the maximum payload byte count threshold has not been exceeded by the sum of the amount of received ingress payload bytes and the previously received ingress payload byte amount for the current time interval, then bandwidth limiter 116 is configured to update the time interval's "total payload byte count value" sum to further include the current operation's byte count (e.g., a 'current bandwidth limitation'). At this stage, bandwidth limiter 116 then forwards the TLS traffic 208 to a decryption manager 120 for decryption processing.

After the bandwidth limiter 116 forwards the encrypted TLS packet traffic to decryption manager 120 for executing the decryption operation, bandwidth limiter 116 then determines if the current execution time is greater than the maximum time interval period. In some embodiments, bandwidth limiter 116 determines that the current time exceeds the duration of the monitoring time slot interval and subsequently computes an end time for a next time interval and resets the total payload byte count. Bandwidth limiter 116 can also alternatively set the maximum payload byte count threshold to a current bandwidth limitation at this time. For example, if a first time interval period (comprising a maximum time interval period of 200 milliseconds) was initiated at t=0 milliseconds, then at t=200 milliseconds the first time interval period would expire and a subsequent/following second time interval period would be initiated. Similarly, a third time interval period would be initiated at t=400 milliseconds. Bandwidth limiter 116 is further configured to reset the total payload byte count (e.g., set total_byte_count equal to zero) at the expiration of each time interval period. Thus, bandwidth limiter 116 continues to process payload bytes (up to a maximum of 200 megabytes) every 200 milliseconds until proxy element 104 ceases to receive TCP packets and or a network operator suspends the operation of monitoring engine 108.

If the encrypted TLS traffic 208 complies with the bandwidth limitation parameters as described above, the encrypted TLS traffic 208 is provided to decryption manager 120, which performs a decryption operation on the encrypted TLS traffic 208. For example, monitoring engine 108 is configured to execute a decryption operation on identified encrypted packets if an accumulated amount of payload bytes of the identified encrypted packets complies with parameters of the bandwidth limitation operation. After producing decrypted TLS traffic, proxy element 104 may utilize a packet copier (not shown in FIG. 2) to copy the decrypted TLS traffic, which can be forwarded to a network tool for analysis and monitoring. At this stage, the decrypted TLS traffic is forwarded to encryption manager 122, which re-encrypts the TLS traffic. Encryption manager 122 subsequently forwards the encrypted TLS traffic to transmitting agent 132, which in turn sends the encrypted TLS traffic to a destination server (e.g., destination server 106 in FIG. 1).

In some embodiments, bandwidth limiter 116 is configured to disregard (i.e., does not count) any packets that require retransmission. Namely, bandwidth limiter 116 is not just simply counting the total number of bytes or total number of encrypted bytes that traverses through proxy element 104. Rather, bandwidth limiter 116 is instead only accounts for "effective throughput traffic." As used herein, the term "effective throughput traffic" can include packet traffic that is i) received by proxy element 104 and ii) processed by proxy element 104 only once. Notably, effective throughput traffic does not include packets that are retransmitted in the event that packets are lost or misplaced after departing proxy element 104 and prior to being received by destination server 106.

Figure 3:
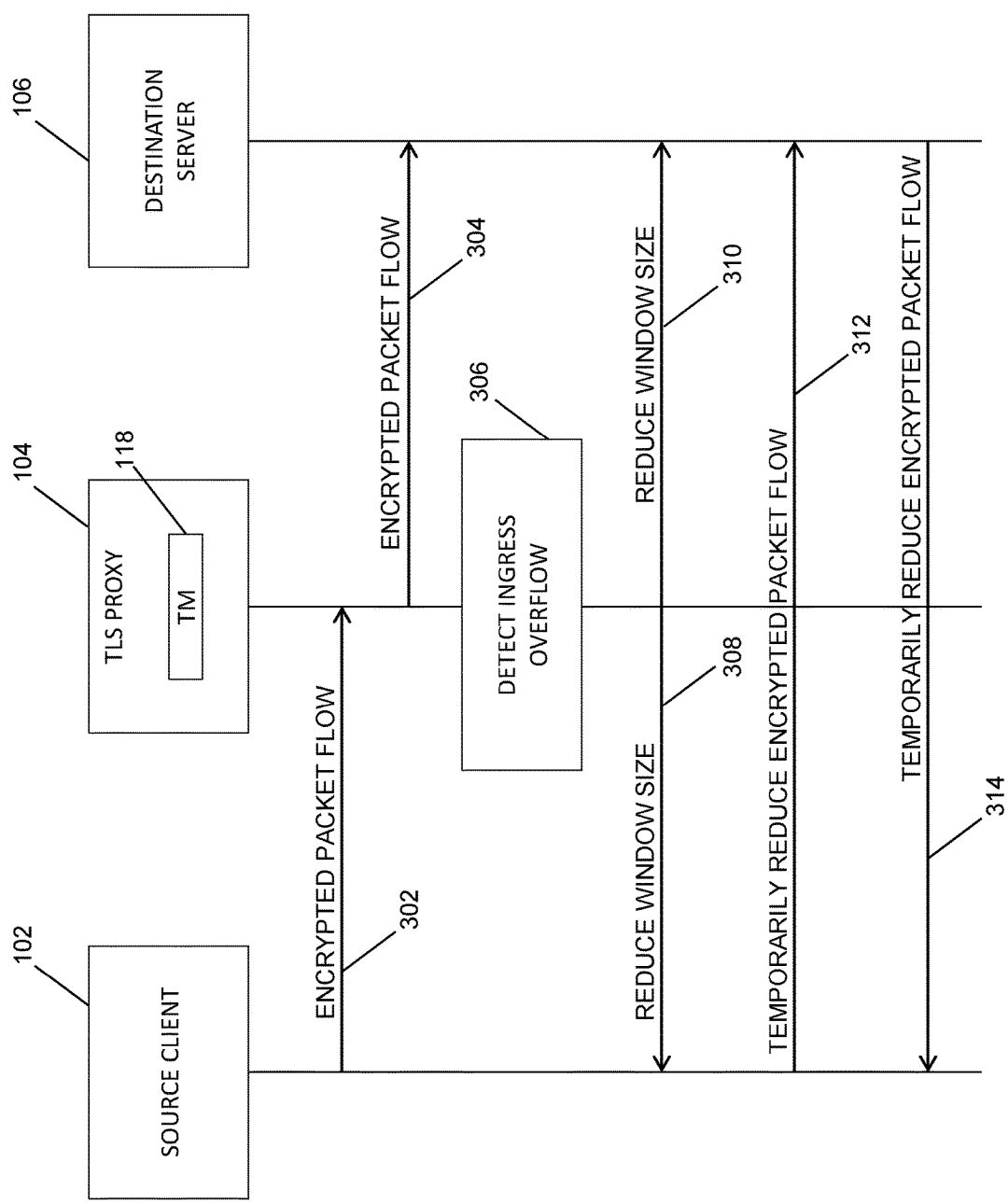
FIG. 3 is a signaling diagram illustrating an exemplary signaling messages communicated by a TLS proxy element to control window sizing for implementing packet traffic throttling according to an embodiment of the subject matter described herein.

FIG. 3 is a signaling diagram illustrating an exemplary signaling messages communicated by a TLS proxy element to control window sizing for implementing packet traffic throttling. In particular, FIG. 3 depicts a proxy element 104 that is interposed and/or positioned in between a source client 102 and a destination server 106 that are communicating using an encryption protocol, such as SSL or TLS (e.g., via HTTPS). As mentioned above, proxy element 104 includes a throttle manager 118 that is adapted to monitor the volume or rate (e.g., gigabits per second) of network traffic associated with the packet flows and/or sessions being handled by proxy element 104. In the event the network traffic received by proxy element 104 reaches a predefined bandwidth threshold (e.g., 1 GB/sec), throttle manager 118 in proxy element 104 is configured to manipulate the TCP window size parameter associated with some or all of the packet flows. As a result, source clients (and/or associated servers) are forced to temporarily throttle or reduce their effective transmission rates.

As used herein, the window size serves to indicate the maximum amount of received data (e.g., payload bytes) that can be buffered at one time by the proxy element 104. As such, a sending entity (e.g., source client 102) may only send that amount of data before waiting for an acknowledgment and/or a window update from throttle manager 118 in proxy element 104. The window size utilized by throttle manager 118 may be predefined in the throttle manager by a network operator. Alternatively the window size may be dynamically determined by throttle manager 118. Using a window size adjustment in conjunction with the aforementioned bandwidth limiter functionality, proxy element 104 is allowed to continue processing (e.g., decryption and encryption operations) all sessions, albeit at a lower bandwidth rate. In addition, proxy element 104 is configured to avoid the dropping of packet flows and sessions during transient packet flow surges, spikes, and or bursts.

Referring to the example illustrated in FIG. 3, proxy element 104 receives an encrypted packet flow 302 from source client 102. The encrypted packet flow is sent by proxy element 104 to destination server 106 as an encrypted packet flow 304. In block 306, proxy element 104 detects an overflow condition. An overflow condition occurs when encrypted packet flow 302 exceeds a predefined bandwidth overflow threshold (e.g., 1 GB/s). Notably, the predefined bandwidth overflow threshold may be any rate value that is designated by a network operator.

In some embodiments, a detected overflow condition (e.g., block 306) triggers proxy element 104 to instruct source client 102 and destination server 106 to reduce the window size. Specifically, proxy element 104 can send a reduce window size message 308 to source client 102 and a reduce window size message 310 to destination server 106. Each of reduce window size message 308 and reduce window size message 310 includes an updated window size value provided by throttle manager 118. In response to receiving the reduce window size message 308, source client 102 is compelled to temporarily send a reduced amount of encrypted packet flow 312 to proxy element 104. Specifically, source client 102 will only send an amount of data specified by the window size to proxy element 104 until an acknowledgement message (or an updated window size) is received from throttle manager 118. Likewise, destination server 106 similarly temporarily sends a reduced amount of encrypted packet flow 314 to proxy element 104 in response to reduce window size message 310. As such, destination server 106 also only sends the amount of data indicated by the window size to proxy element 104 until an acknowledgement message (or an updated window size) is received from throttle manager 118.

In some embodiments, after a predefined time, throttle manager 118 is configured to periodically increase the TCP window size back to the bandwidth rate that existed prior to the detected overflow condition. Alternatively, throttle manager 118 may be configured to increase the TCP window size back to the predefined maximum TCP window size setting value established by network operator once the volume of packet traffic received by proxy element 104 reduces to more manageable levels.

FIG. 4 is a flow chart illustrating an exemplary method 400 for implementing bandwidth limitations on specific application traffic at a proxy element according to an embodiment of the subject matter described herein. In some embodiments, blocks 402-410 of method 400 may represent an algorithm performed by a monitoring engine and/or a bandwidth limiter that is stored in memory and executed by one or more processors.

In block 402, method 400 includes receiving, at a proxy element, a packet flow from at least one source client. In some embodiments, a proxy element receives a TCP packet flow from a source client that is directed to a destination server. Notably, the TCP packet flow includes both clear text packets and encrypted packets (e.g., encrypted SSL or encrypted TLS packets).

In block 404, method 400 includes identifying encrypted packets associated with a specific application traffic type from the packet flow. In some embodiments, a monitoring engine in the proxy element is configured to inspect the headers of the received packets in order to identify a specific application traffic type that is being monitored (e.g., encrypted TLS packets).

In block 406, method 400 includes directing the identified encrypted packets to a bandwidth limiter in the proxy element. In some embodiments, the monitoring engine is configured to forward the identified encrypted packets to bandwidth limiter included in the proxy element. Similarly, the monitoring engine is further configured to forward packets that are not associated with the specific application traffic type directly to a transmitting agent and/or network interface card for transmitting the non-monitored packet Traffic to the destination server.

In block 408, method 400 includes applying a bandwidth limitation operation to the identified encrypted packets. In some embodiments, bandwidth limiter receives and begins forwarding the identified encrypted packets to a decryption manager that is responsible for conducting that decryption operation. For example, the bandwidth limiter is characterized by a number of predefined and configurable parameters, such as a monitoring time slot interval and a maximum payload byte count threshold. By adjusting these parameters, the proxy element may be configured to provide monitoring functionality at a number of different bandwidth throughput levels or rates (e.g., various licensed rates).

In block 410, method 400 includes decrypting the identified encrypted packets if the payload size of the identified encrypted packets complies with the parameters of the bandwidth limitation operation. In some embodiments, the bandwidth limiter is configured to forward the encrypted packets to a decryption manager if the payload size of received encrypted packets does not exceed the maximum payload byte count threshold within a particular monitoring time slot interval.

It should be noted that each of the proxy element, monitoring engine, bandwidth limiter, throttle manager and/or functionality described herein may constitute a special purpose computing device. Further, the proxy element, monitoring engine, bandwidth limiter, throttle manager, and/or functionality described herein can improve the technological field of computer network communications and security. More specifically, the disclosed system and/or proxy element can be configured to accommodate a number of different throughput rates for a specific application traffic type (e.g., encrypted SSL or TLS traffic) such that proper security measures and/or packet analysis can be performed. As such, the disclosed proxy element affords the technical advantage of effectively managing and throttling a specific application traffic type in order to ensure that proper packet traffic monitoring processes are conducted without dropping or disregarding packets in overflow conditions.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for implementing bandwidth limitations on specific application traffic at a proxy element, the method comprising:

receiving, by a proxy element, an encrypted packet flow from at least one source client;
utilizing a bandwidth limiter in the proxy element to apply a bandwidth limitation operation to the encrypted packet flow from the at least one source client, wherein the bandwidth limiter detects an amount of the encrypted packet flow by determining a total payload byte count of the encrypted packet flow received during a time interval comprising a predetermined length of time;
executing a window size manipulation operation if the detected amount of encrypted packet flow exceeds a predefined bandwidth overflow threshold of the bandwidth limitation operation, wherein the window size manipulation operation includes sending, by a throttle manager in the proxy element, a reduce window size message that specifies an updated window size value to the at least one source client; and
storing at least a portion of the received encrypted packet flow until the time interval expires when the detected amount of encrypted packet flow exceeds the predefined bandwidth overflow threshold of the bandwidth limitation operation.

2. The method of claim 1 wherein the at least one source client is compelled to send, to the proxy element, a reduced amount of encrypted packet flow based on the updated window size value in response to receiving the reduce window size message.

3. The method of claim 1 wherein the updated window size value is dynamically determined by the throttle manager or predefined by a network operator.

4. The method of claim 1 wherein the updated window size value is a transmission control protocol (TCP) window size value.

5. The method of claim 1 wherein the window size manipulation operation includes sending, by a throttle manager in the proxy element, a reduce window size message that specifies an updated window size value to a destination server associated with the encrypted packet flow.

6. The method of claim 5 wherein the destination server is compelled to send, to the proxy element, a reduced amount of encrypted packet flow based on the updated window size value in response to receiving the reduce window size message.

7. The method of claim 1 wherein the encrypted packet flow includes either encrypted secure session layer (SSL) packets or encrypted transport layer security (TLS) packets.

8. A system for implementing bandwidth limitations on specific application traffic at a proxy element, the system comprising:
a processor;
a memory included in the proxy element;
a monitoring engine that is stored in the memory of the proxy element and when executed by the processor is configured for receiving an encrypted packet flow from at least one source client;
a bandwidth limiter that is stored in the memory of the proxy element and when executed by the processor is configured for:
applying a bandwidth limitation operation to the encrypted packet flow from the at least one source client; and
detecting an amount of the encrypted packet flow by determining a total payload byte count of the encrypted packet flow received during a time interval comprising a predetermined length of time; and a throttle manager that is stored in the memory of the proxy element and when executed by the processor is configured for executing a window size manipulation operation if the detected amount of encrypted packet flow exceeds a predefined bandwidth overflow threshold of the bandwidth limitation operation, wherein the window size manipulation operation includes sending a reduce window size message that specifies an updated window size value to the at least one source client;
wherein the memory is configured to store at least a portion of the received encrypted packet flow until the time interval expires when the detected amount of encrypted packet flow exceeds the predefined bandwidth overflow threshold of the bandwidth limitation operation.

9. The system of claim 8 wherein the at least one source client is compelled to send, to the proxy element, a reduced amount of encrypted packet flow based on the updated window size value in response to receiving the reduce window size message.

10. The system of claim 9 wherein the updated window size value is dynamically determined by the throttle manager or predefined by a network operator.

11. The system of claim 9 wherein the updated window size value is a transmission control protocol (TCP) window size value.

12. The system of claim 8 wherein the window size manipulation operation includes sending, by the throttle manager in the proxy element, a reduce window size message that specifies an updated window size value to a destination server associated with the encrypted packet flow.

13. The system of claim 12 wherein the destination server is compelled to send, to the proxy element, a reduced amount of encrypted packet flow based on the updated window size value in response to receiving the reduce window size message.

14. The system of claim 8 wherein the encrypted packet flow includes either encrypted secure session layer (SSL) packets or encrypted transport layer security (TLS) packets.

15. A non-transitory computer readable medium having stored thereon executable instructions that when executed by a processor of a computer control the computer to perform steps comprising:
receiving, by a proxy element, an encrypted packet flow from at least one source client;
utilizing a bandwidth limiter to apply a bandwidth limitation operation to the encrypted packet flow from the at least one source client, wherein the bandwidth limiter detects an amount of the encrypted packet flow by determining a total payload byte count of the encrypted packet flow received during a time interval comprising a predetermined length of time;
executing a window size manipulation operation if a detected amount of encrypted packet flow exceeds a predefined bandwidth overflow threshold of the bandwidth limitation operation, wherein the window size manipulation operation includes sending, by a throttle manager in the proxy element, a reduce window size message that specifies an updated window size value to the at least one source client; and
storing at least a portion of the received encrypted packet flow until the time interval expires when the detected amount of encrypted packet flow exceeds the predefined bandwidth overflow threshold of the bandwidth limitation operation.

16. The non-transitory computer readable medium of claim 15 wherein the at least one source client is compelled to send, to the proxy element, a reduced amount of encrypted packet flow based on the updated window size value in response to receiving the reduce window size message.

17. The non-transitory computer readable medium of claim 15 wherein the updated window size value is dynamically determined by the throttle manager or predefined by a network operator.

\* \* \* \* \*

UNITED STATES PATENT AND TRADEMARK OFFICE
CERTIFICATE OF CORRECTION

PATENT NO. : 11,716,313 B2
APPLICATION NO. : 17/111445
DATED : August 1, 2023
INVENTOR(S) : Gabriel Oprisan et al.

It is certified that error appears in the above-identified patent and that said Letters Patent is hereby corrected as shown below:

In the Claims

In Column 12, Line 21, in Claim 10, delete "claim 9" and insert -- claim 8 --.

In Column 12, Line 24, in Claim 11, delete "claim 9" and insert -- claim 8 --.

Signed and Sealed this
Twenty-eighth Day of November, 2023

Katherine Kelly Vidal
*Director of the United States Patent and Trademark Office*